May 2, 1939.  S. G. BARNARD  2,156,424
SELF LOADING TRUCK
Filed Nov. 10, 1936  3 Sheets-Sheet 3
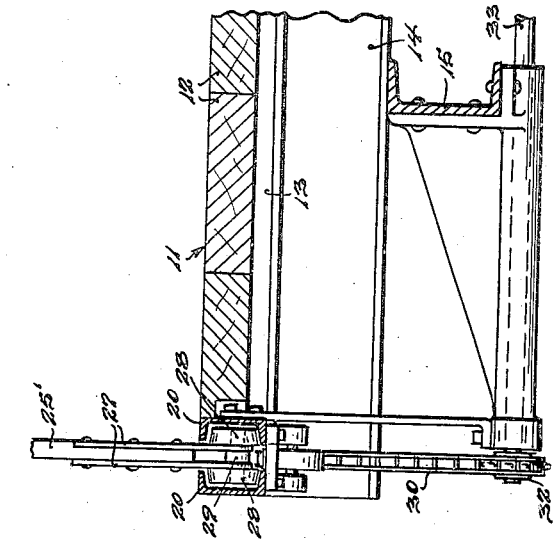
Fig. 7.
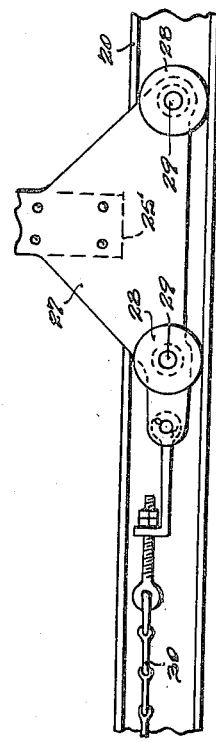
Fig. 6.
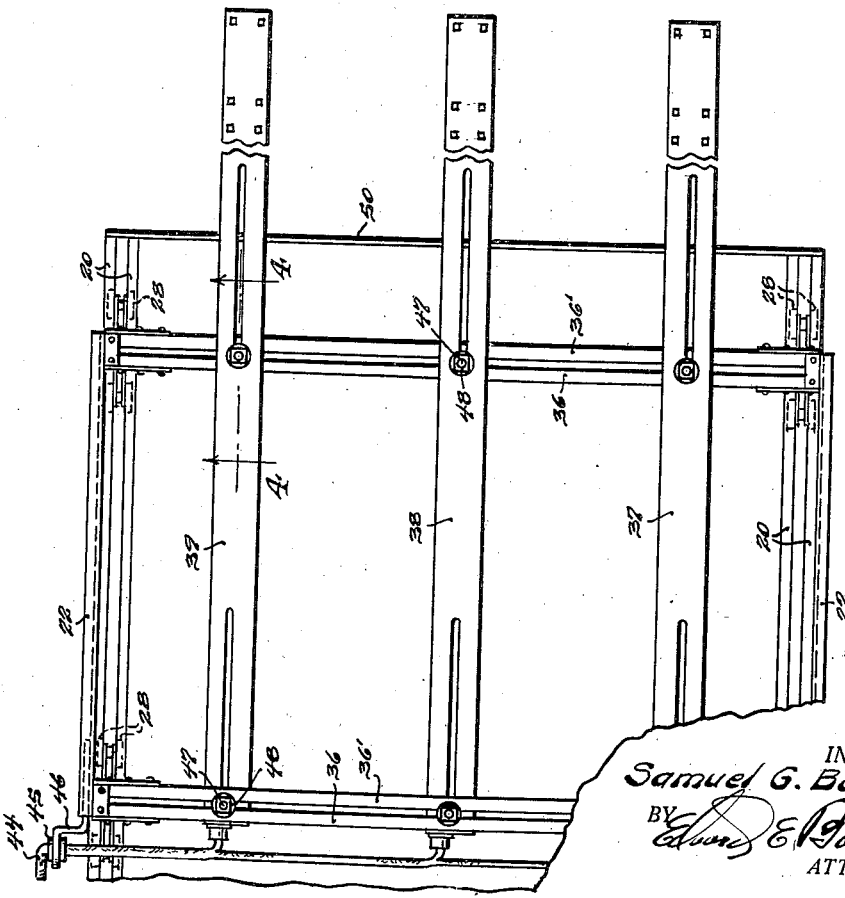
Fig. 5.
INVENTOR.
Samuel G. Barnard
ATTORNEYS.

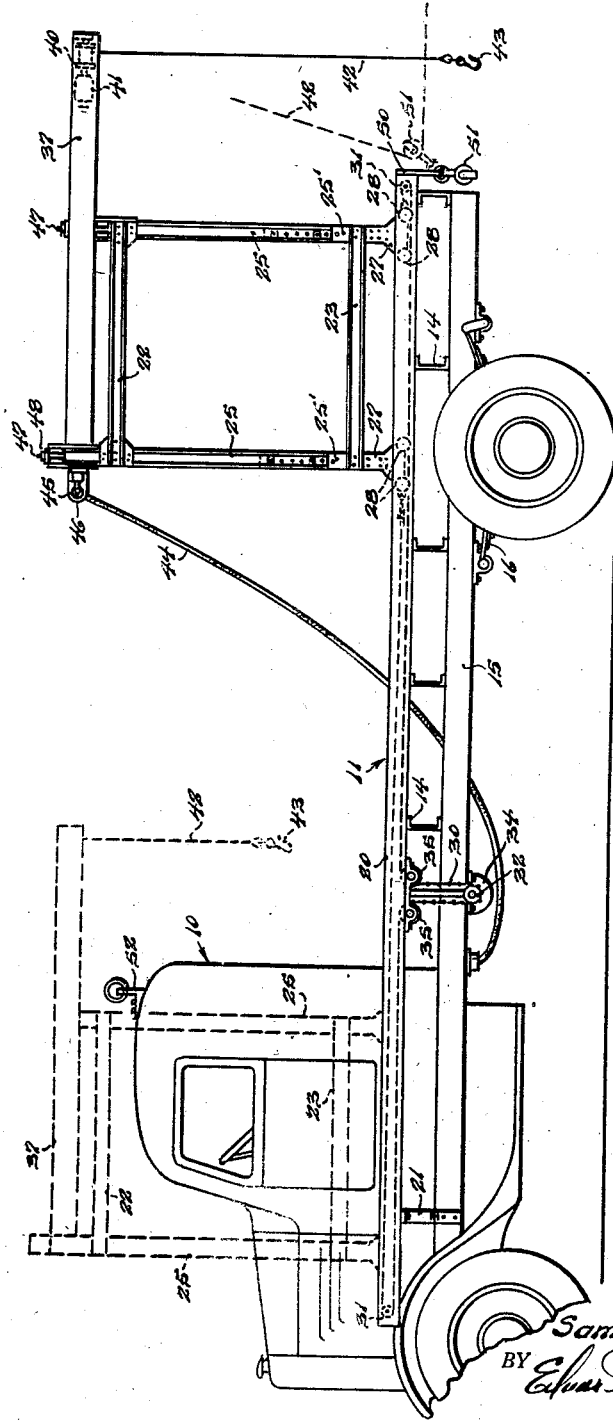

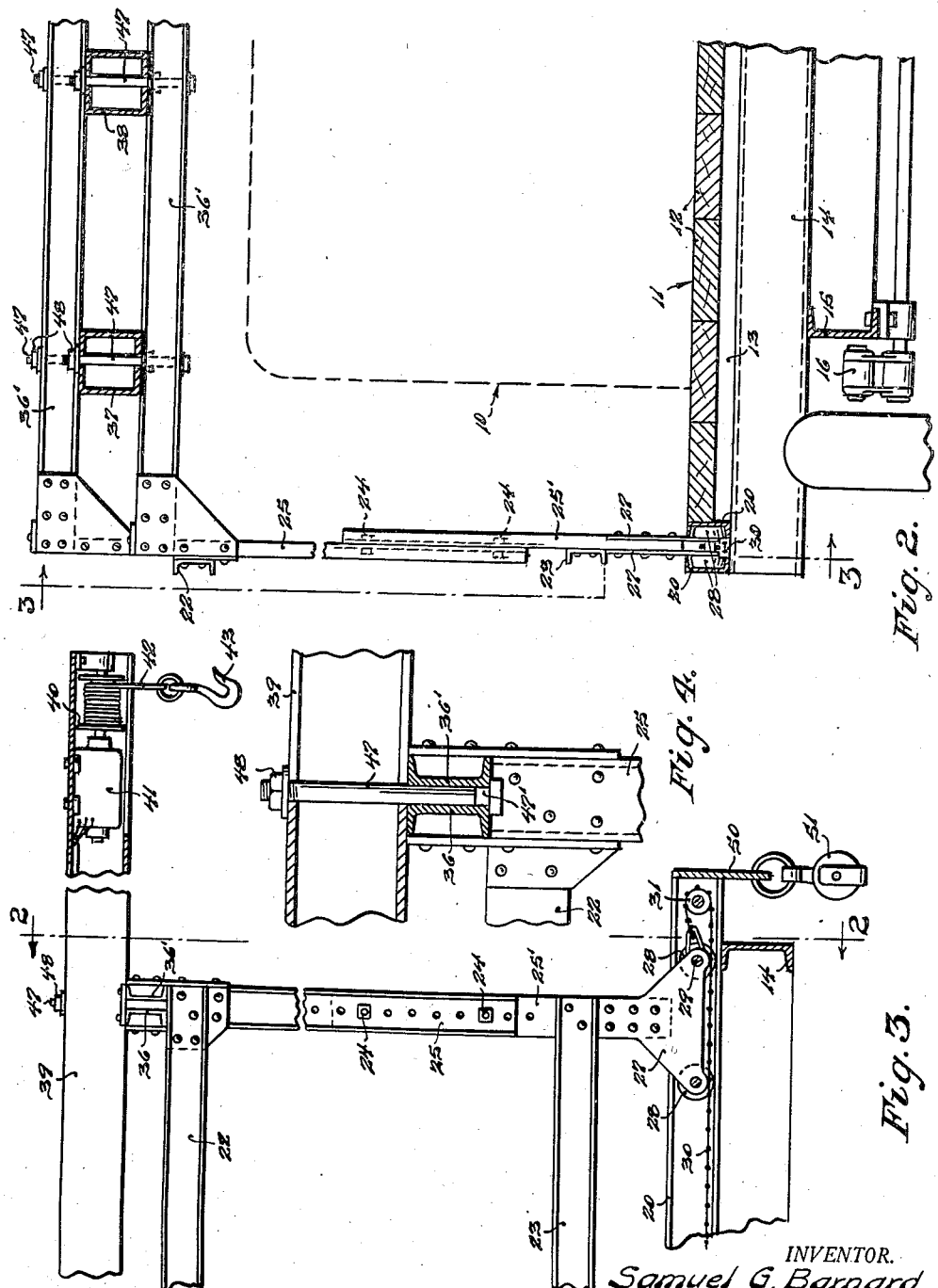

Patented May 2, 1939

2,156,424

UNITED STATES PATENT OFFICE 2,156,424

SELF-LOADING TRUCK

Samuel G. Barnard, Seattle, Wash.

Application November 10, 1936, Serial No. 110,087

15 Claims. (Cl. 214—65)

This invention relates to self-loading trucks with the principal object thereof being to provide structure by means of which the manual labor required to load freight on and, at destination, unload freight from automotive trucks is reduced to a minimum. Further and more particular objects and advantages will, together with the foregoing primary aim, appear in the course of the following description and in the claims annexed thereto.

The invention consists in the novel construction of parts and in the adaptation and combination of the same as hereinafter described and claimed, reference in said description being had to the accompanying drawings.

In said drawings:

Figure 1 is a view in side elevation representing an automotive truck provided with load-handling mechanism constructed according to the now preferred embodiment of the present invention.

Fig. 2 is a fragmentary enlarged transverse sectional view taken through the rear end of the truck on the line 2—2 of Fig. 3, the latter view being similarly fragmentary and taken partly in side elevation and partly in longitudinal vertical section on the line 3—3 of Fig. 2.

Fig. 4 is a still further enlarged fragmentary transverse vertical section taken on the line 4—4 of Fig. 5.

Fig. 5 is a view to the scale of Figs. 2 and 3 indicating the load-handling carriage in top plan.

Fig. 6 is a fragmentary enlarged side elevational view to indicate one of the forwardly disposed wheel assemblies of the carriage together with an associated channel rail in which the same tracks; and Fig. 7 is a fragmentary transverse vertical section illustrating the drive assembly by which longitudinal movement of the carriage is effected.

The automotive truck to which the load-handling structure is applied is generally conventional in its provision of a forwardly disposed driver's cab 10 having to its rear a loading platform 11 which is or may be comprised of wood planking or other suitable surfacing 12 supported by filler strips as 13 introduced above transverse beams 14, the beams constituting the chassis frame together with the main longitudinal channels 15. The supporting springs by which said channels are carried above the running gear of the vehicle are designated by 16.

In the embodiment shown the beams 14 are terminally projected beyond the lateral limits of the planking to permit the attachment over said beam ends at each side of the vehicle of companion track-forming channels 20 which are arranged on edge in spaced face-to-face relation desirably flush with the loading surface, said tracks, as illustrated in Fig. 1, being carried the approximate length of the vehicle with the forward prolongations at each side of the driver's cab being supported by angle brackets or the like 21.

The carriage employed is desirably comprised of truss frames which lie perpendicularly in the vertical planes of the tracks with the upper ends coupled by longitudinally-spaced horizontal girders, said truss frames in the form indicated providing a pair of vertical legs which at upper and lower ends are connected rigidly by horizontal tiebeams 22 and 23. Pairs of spaced triangular foot plates 27 support the respective truss legs and these plates are received through the throat formed between the companion track channels and operate as journal members to support carriage wheels 28 which track in the channels, the wheels being supported at each side of the companion foot plates. As can be best seen from an inspection of Fig. 7, the wheel-supporting axles 29 are formed with a central boss which lies between the foot plates as a spacing element therefor. As a means for adjusting the height of the truss frames and correspondingly the head clearance of the carriage, each of the truss legs are comprised of two channel members lying in back-to-back relation with adjustment being obtained through the instrumentality of coupling bolts 24 engageable in selective bolt holes formed in the channels. The contiguous leg-forming channels are represented by 25 and 25'.

For driving the carriage, the invention employs chains 30 which operate in unison, the chain ends being connected with the forwardly and rearwardly disposed wheel assemblies of the respective truss frames and passing at each end of the tracks about idling sprocket wheels 31, the lower level of the respective chains leading from the idler sprocket wheels about a driving sprocket wheel 32, which sprocket wheels 32, one for each of the two chains, are fixedly mounted on a transversely extending and suitably actuated drive shaft 33. I prefer, as a driving medium for said shaft, to employ an electrically energized and reversing-type motor 34 together with self-locking helical-centric reduction gearing, the motor being supported from the vehicle frame at a point medially of the truck width. Idling sprocket wheels 35 are provided for the chains in advance of and following the passage of the chains over the driving sprocket wheels and for chain take-up adjusting means as indicated in Fig. 6 are provided at one or both ends of the chains.

Referring to the transverse truss-coupling head girders, each of the same are preferably formed from a pair of coactive channels 36, 36' supported on edge in spaced parallel relation and said pair of channels which collectively operate as the rear girder for the carriage desirably lie in a plane below that occupied by the pair of channels which act as the forward girder. Supported by said girders are laterally spaced longitudinal boom arms as indicated at 37, 38, and 39 passed over and under the rearwardly and forwardly disposed girders, respectively, and secured thereto to normally project rearwardly from the carriage, the boom arms being preferably of box formation to provide a housing which in the overhanging portion of the respective arms receives a cable drum 40 driven through self-locking helical-centric reduction gearing from a reversing-type electric motor 41. 42 represents the cables, provided with hooks 43, which are controlled by the independent drum and motor assemblies.

Current to the motors is supplied through a four-wire circuit longitudinally of the boom arms, the wires at the forward end of the boom arms being received in a flexible cable 44 which extends transversely and is slidably supported through the collar 45 of a bracket 46 carried laterally of the carriage, the cable extending at the side of the vehicle to a suitable switch box supported by the vehicle frame. It is believed obvious that the box provides independently operated switches, located in a position convenient to the vehicle operator, for each of the motors 41 and the motor 34.

In the now preferred construction the boom arms of the carriage are adjustable transversely and longitudinally and for this purpose the upper and lower walls of the box arms 37, 38, and 39 are slotted longitudinally with bolts being passed through such slots and through the transverse slots formed between the girder channels 36, 36'. For clamping the boom arms in selected positions, the bolts, designated by 47, are engaged at their upper exposed ends by nuts 48, squared shank portions 47' of the respective bolts facilitating adjustment by eliminating the necessity of applying a wrench to the head end of the bolts.

It is believed readily understood that for normal loading operations, as when handling packing cases of ordinary size, bales, and the like, the boom arms are maintained in the postions shown, lateral adjustment being made only where the demands of a particular character of freight require and the longitudinal adjustment being made only where the boom arms, in their inoperative forward location at which the carriage overlies the driver's cab, would interfere with the load by reason of the latter extending above the upper limits of the carriage as might, for example, occur when handling a tank of large diameter. In picking up the freight, elevating the same above the surface of the load platform, and depositing the load in the desired position relative to the truck, the boom arms may be employed to handle portions of the load independently or the same may be used collectively.

I direct attention to the manner in which the wire-carrying cable 44 is illustrated, the same for simplicity being shown as taut between the boom arms. In practice this cable is relatively loose to permit independent adjustment of the boom arms.

Designated at 50 is a plate secured to lie transversely of the vehicle at the tail end of the same, this plate being apertured at spaced intervals of its length for the selective reception of snatch blocks 51 which are employed in the manner indicated by dotted lines in Fig. 1 for load-dragging purposes, a plate 52 for the related purpose of dragging a load longitudinally of the truck platform where the load height demands that the carriage be maintained in its forward position being provided at the forward end of the vehicle, either supported on the roof of the cab, as indicated, or in such other suitable position as might be desired. It is to be noted that by passing a cable from a forwardly supported snatch block through a rearwardly disposed snatch block and thence back to a load carried by the truck that the load may be backed from the truck without necessitating longitudinal movement of the carriage.

As previously applied, load-handling structures have been provided at warehouses, docks, and the like for the purpose of loading freight on and unloading freight from automotive trucks. So far as I am aware, however, there has not heretofore been a practical solution of the problem of rapidly handling truck loads at all points within the range of operation of the truck. Aside from the element of reducing the manual labor necessary to handle truck freight, the invention, by an appreciable reduction in the freight-handling time, expands the field of operations in that the periods during which the truck is actually in transit are increased proportionately with a reduction in loading time.

What I claim, is:

1. In combination with an automotive truck providing a driver's cab and a loading platform to the rear of the cab, a carriage supported for movement longitudinally of the truck from the extreme forward limit of the cab to the extreme rear limit of the platform, said carriage being formed to have the rear end thereof clear the platform in the forward position of the carriage, and load-hoisting means supported by the carriage to permit travel of the same longitudinally with the carriage.

2. In combination with an automotive truck providing a loading platform, a load-handling winch-and-cable assembly carried by the truck for longitudinal movement relative to the platform, a chain supported by the truck and engaging the load-handling assembly at the forward and rear limits thereof for selectively actuating said assembly in either direction longitudinally of the platform, and independently controlled and reversible motor-driven means by which to operate the winch for elevating and lowering the load and by which to actuate the chain.

3. In combination with an automotive truck providing a loading platform, a carriage supported by the truck for movement longitudinally of the platform, load-hoisting means movable with the carriage comprised of a horizontal boom arm, a winch, and a hoisting cable operated by the winch and depending from the boom arm, and means for slidably adjusting the boom arm laterally and longitudinally relative to the carriage.

4. In combination with an automotive truck providing a loading platform, a carriage supported by the truck for longitudinal movement relative to the platform, and load-hoisting means movable with the carriage and comprised of a slidably adjustable boom arm, a winch, and a hoisting cable operated by the winch and depending from the boom arm.

5. In combination with an automotive truck providing a driver's cab at the forward end of the same and a loading platform extending rearwardly therefrom, track-forming rails lying at each side of said platform and cab and extending longitudinally of the truck for the approximate length of the same, and a wheeled load-handling carriage tracking on said rails, said carriage being of an inverted-U shape in end elevation and employing vertically-adjustable truss frames at each side coupled at the upper limits by a transversely extending head girder over the cab.

6. In combination with an automotive truck providing a loading platform, track-forming rails lying at each side of the platform and extending longitudinally thereof, a wheeled carriage having tracking engagement at its forward and rear ends on the rails, said carriage being formed to an inverted-U shape and being adjustable as to height to permit uninterrupted travel of the carriage over a load supported on the platform, and a load-handling cable supported for movement with the carriage.

7. In combination with an automotive truck providing a loading platform, longitudinally-extending track-forming rails supported by the truck to lie at each side of the platform in relatively flush relation to the loading surface of the same, a wheeled load-handling carriage of an inverted-U form tracking on said rails, the head structure of said carriage comprising longitudinally spaced transverse girders, a boom arm lying under the forward and over the rear head girders and projecting rearwardly from the carriage, a hoisting drum supported by the carriage, a load-engaging cable located to depend from the overhanging portion of the boom arm and operated by the drum, and means for actuating the drum to elevate the load above the surface of the platform for longitudinal movement with the carriage into load-receiving position on the latter.

8. In combination with an automotive truck providing a driver's cab and a loading platform extending longitudinally therefrom, track-forming rails lying at each side of the platform and the cab and extending longitudinally of the truck for the approximate length of the same, a wheeled load-handling carriage tracking on said rails and movable in its forward position beyond the rear limits of the cab, said carriage having an inverted-U form with the head-forming cross member lying above the upper limits of the cab to permit movement of the carriage over the cab, and means comprised of a reversing-type motor-driven drum and a load-engaging cable operated thereby, said means being supported by the carriage, for elevating the load above the surface of the platform for movement with the carriage into selected positions relative to the platform.

9. In combination with an automotive truck providing a driver's cab and a loading platform to the rear of the cab, truck-supported track-forming rails disposed laterally of the truck to extend the approximate length of the truck at each side of the platform and the cab, a wheeled load-handling carriage of an inverted-U form arranged for tracking engagement relative to the rails for travel longitudinally of the truck over the loading platform and the cab, said carriage supporting a plurality of longitudinally disposed laterally-spaced boom arms mounted to project rearwardly from the carriage, and independently actuated winch-and-cable assemblies carried by each of said boom arms to have the cables depend from the overhanging portions of the boom arms.

10. In combination with an automotive truck providing a forwardly-disposed driver's cab and a loading platform lying to the rear of the same, longitudinal track-forming truck-supported rails extending the approximate length of the truck at each side of said platform and the cab, a wheeled load-handling carriage tracking said rails for longitudinal travel and formed to an inverted-U shape in end elevation, said carriage being comprised of laterally disposed vertical truss frames supported at each end by the carriage wheels and coupled at the upper ends by longitudinally spaced and transversely extending horizontal girders, a plurality of longitudinally disposed and laterally spaced boom arms supported by the girders to extend in overhanging relation to the rear wheels of the carriage, carriage-supported winches for the respective boom arms and load-hoisting cables therefor located to depend from the overhanging portions of the boom arms, a plurality of reversing-type electric motors and self-locking reduction gearing connecting the motors in driving relation to the respective winches, a carriage-operating chain, a driving motor operative to said chain for actuating the carriage in either direction of longitudinal travel, and means by which said several motors are controlled independently.

11. The structure defined in claim 10, and truck-supported means for guiding the hoisting cables to permit the same to be utilized for dragging a load.

12. In combination with an automotive truck providing a loading platform, track-forming rails lying at each side of the platform, a wheeled carriage tracking on said rails and formed to an inverted-U shape to permit uninterrupted travel of the carriage over a load supported on the platform, a load-hoisting cable carried by the carriage, and truck-supported means for guiding said cable to permit the same to be utilized for dragging a load into position whereat the cable may be employed for hoisting the same.

13. In combination with an automotive truck providing a loading platform, a boom arm supported for movement longitudinally of the platform in elevated relation thereto, and load-handling means carried by the boom arm comprising a winch, a winch-operated cable, a reversing-type electric motor, and self-locking reduction gearing connecting the motor in driving relation to the winch.

14. In combination with an automotive truck providing a loading platform, a boom arm supported for movement longitudinally of the platform in elevated relation thereto, a winch and a winch-operating electric motor carriage by and in fixed relation to the boom arm, and a load-hoisting cable for the winch.

15. The structure as defined in claim 14 wherein said boom arm is of box design providing a weather-guarded recess for the winch and the motor.

SAMUEL G. BARNARD.

CERTIFICATE OF CORRECTION.

Patent No. 2,156,424.  May 2, 1939.

SAMUEL G. BARNARD.

It is hereby certified that error appears in the printed specification of the above numbered patent requiring correction as follows: Page 3, second column, line 66, claim 14, for the word "carriage" read carried; and that the said Letters Patent should be read with this correction therein that the same may conform to the record of the case in the Patent Office.

Signed and sealed this 13th day of June, A. D. 1939.

Henry Van Arsdale (Seal)  Acting Commissioner of Patents.